United States Patent
Liu et al.

(10) Patent No.: US 12,079,457 B2
(45) Date of Patent: Sep. 3, 2024

(54) METHODS, DEVICES, AND MEDIA FOR SCALING SMART WATCH GUI BASED ON INITIAL STROKE POSITION

(71) Applicants: Zhe Liu, Richmond Hill (CA); Qiang Xu, Richmond Hill (CA); Hanaë Rateau, Lille (FR); Damien Masson, Waterloo (CA)

(72) Inventors: Zhe Liu, Richmond Hill (CA); Qiang Xu, Richmond Hill (CA); Hanaë Rateau, Lille (FR); Damien Masson, Waterloo (CA); Edward Lank, Cambridge (CA)

(73) Assignees: Huawei Technologies Canada Co., Ltd., Kanata (CA); Hanae Rateau, Lille (FR); Damien Masson, Waterloo (CA); Edward Lank, Cambridge (CA)

( * ) Notice: Subject to any disclaimer, the term of this patent is extended or adjusted under 35 U.S.C. 154(b) by 0 days.

(21) Appl. No.: 17/894,739

(22) Filed: Aug. 24, 2022

(65) Prior Publication Data
US 2024/0069701 A1 Feb. 29, 2024

(51) Int. Cl.
| | | |
|---|---|---|
| G06F 3/04886 | (2022.01) |
| G04G 21/08 | (2010.01) |
| G06F 3/04817 | (2022.01) |
| G06F 3/04842 | (2022.01) |
| G06F 3/04845 | (2022.01) |

(52) U.S. Cl.
CPC ......... G06F 3/04842 (2013.01); G04G 21/08 (2013.01); G06F 3/04817 (2013.01); G06F 3/04845 (2013.01); G06F 3/04886 (2013.01)

(58) Field of Classification Search
CPC ............. G06F 3/04842; G06F 3/04817; G06F 3/04845; G06F 3/04886; G04G 21/08
See application file for complete search history.

(56) References Cited

U.S. PATENT DOCUMENTS

| | | | | |
|---|---|---|---|---|
| 2004/0174399 A1* | 9/2004 | Wu | ...................... | G06F 3/04883 715/863 |
| 2008/0096610 A1* | 4/2008 | Shin | ..................... | G06F 3/04886 455/566 |
| 2016/0041749 A1* | 2/2016 | Liu | ...................... | G06F 3/04886 715/863 |
| 2017/0115831 A1* | 4/2017 | Bosze | ................. | G06F 3/04886 |

* cited by examiner

*Primary Examiner* — Rinna Yi

(57) ABSTRACT

Methods, devices, and processor-readable media for scaling up graphical user interface (GUI) elements on a smart watch touchscreen based on the initial position of a stroke gesture, thereby facilitating selection, by a user, of a target GUI element. The user only needs to perform one stroke action to select the desired target. During the procedure, GUI elements of the main screen are scaled up to make target selection easier, and the GUI elements are automatically reset to their original size when the procedure is complete. To achieve this result, a "stroke with initial position" gesture is used to select a target.

15 Claims, 9 Drawing Sheets

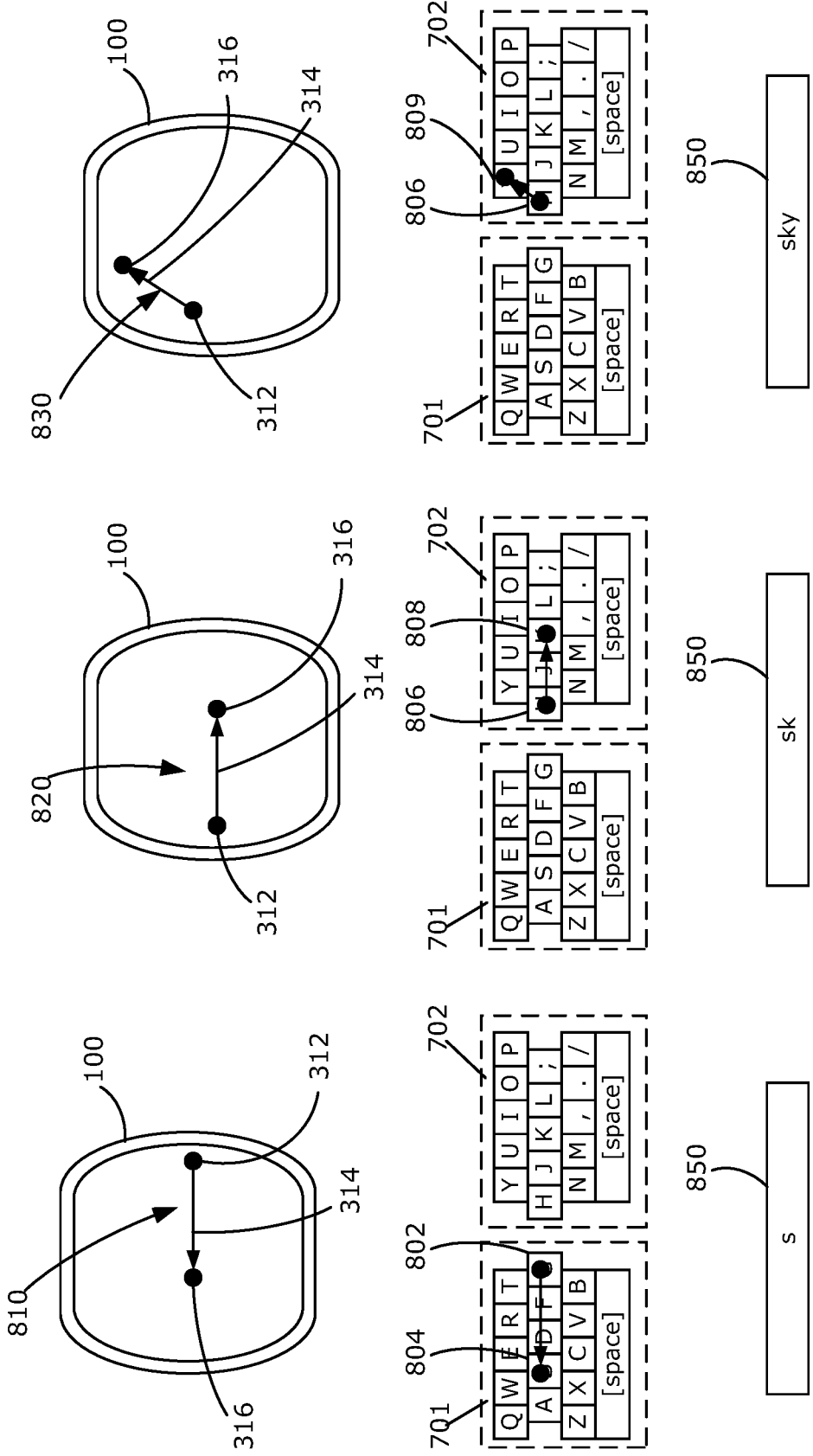

METHODS, DEVICES, AND MEDIA FOR SCALING SMART WATCH GUI BASED ON INITIAL STROKE POSITION

RELATED APPLICATION DATA

This is the first patent application related to this matter.

FIELD

The present application generally relates to touchscreen user interfaces, and in particular to methods, devices, and media for scaling up graphical user interface elements of a smart watch based on the initial position of a stroke gesture.

BACKGROUND

Smart watches, functioning as convenient on-wrist smart devices, have become increasingly popular in the wearable market. As smaller and more powerful sensors and circuit components of smart watches are developed, smart watches can be built in with richer and more advanced hardware, making them more functional and more convenient. Currently, in many situations, a smart watch can nearly replace the fundamental operations of a smart phone, including controlling music playback and phone calls, checking the weather and temperature, navigating to a map destination, and even checking and replying to messages. These functions all rely on two core operations: target selection and target confirmation. Target selection is the process by which a user selects a desired command for a device to execute: for example, when a user taps an icon on a touchscreen to select a command associated with the icon. Target confirmation is the process by which a user, after being presented with feedback identifying a selected command, confirms the selection: for example, by responding to a visual prompt on a touchscreen displayed in response to the user's selection. In some circumstances, target selection and target confirmation are combined into a single interaction; in others, they involve two separate interactions.

Smart watch user interfaces are quite limited in their ability to support target selection and target confirmation. One major reason for this limitation is the size of the watch face, which typically functions as a touchscreen interface between the user and the operations of the smart watch. Because it must be worn on a wrist, a smart watch face cannot be too big, either in appearance, size, or weight. However, users' average finger size is fixed within a range of normal human variation, which leads to the so-called "fat finger" problem defined in the field of human-machine interaction (HCI) and user interface (UI) design. The fat finger problem is typically defined as making a mistake by pressing the wrong key on a keyboard or number pad.

There thus exists a need for techniques to facilitate target selection and/or target confirmation on a touchscreen.

SUMMARY

The present disclosure describes methods, devices, and media for scaling up graphical user interface (GUI) elements on a touchscreen based on the initial position of a stroke gesture. Some embodiments described herein may thereby facilitate selection, by a user, of a target GUI element on a touchscreen of a device such as a smart watch.

In some examples, the multi-action sequence described above for overcoming the fat finger problem can be combined into one operation, such that a user only needs to perform one action to select the desired target and confirm the selection. During the procedure, GUI elements of the main screen are scaled up to make target selection easier, and the GUI elements are automatically reset to their original size to show the main screen when the procedure is complete. To achieve this result, a "stroke with initial position" gesture is used to select a target.

By using a "stroke with initial position" gesture for target selection on a smart watch as described herein, various advantages may be realized by some embodiments. By scaling up target GUI elements and allowing a user to confirm the target selection by adjusting the trajectory of the stroke, target selection accuracy and success rate may be improved without requiring multiple actions by the user, thereby improving the user experience when interacting with a smart watch or other touchscreen-based device. Scaling up of the UI elements may be performed by mapping the initial position of the stroke gesture to a target region of the main UI screen. This mapping may be implemented by a mapping UI mode.

Two mapping UI modes are described herein: same-side and opposite-side mapping UI modes. In a same-side mapping UI mode, the initial position of a stroke gesture on the touchscreen is performed within a screen region the user intends to scale up. In an opposite-side mapping UI mode, the initial position of a stroke gesture on the touchscreen is performed within a screen region different from the region that the user intends to scale up.

As used herein, the term "touchscreen" refers to a touch-sensitive surface which also functions as a digital display. Thus, a touchscreen may function as both a user input device to capture gestures performed in contact with the touchscreen surface, as well as a user output device to display visual information. The touch sensing function of a touchscreen may operate according to various physical principles, such as electrical capacitance.

As used herein, the term "gesture" refers to an action performed by an object in contact with (or near-contact with) a touchscreen surface, such that the touchscreen can sense the action. Gestures may be performed with one or more fingers, and/or with other objects. Gestures may include touches, taps, swipes, and strokes performed with one or more fingers, pinches and rotations performed with multiple fingers, and other gestures suitable for detection by a touchscreen.

As used herein, the terms "stroke" and "stroke gesture" are used interchangeably to refer to a type of gesture performed by a user on a touchscreen surface. In a stroke gesture, a user touches the touchscreen with a finger (or multiple fingers, or other object(s)) at an initial position on the touchscreen surface, holds the touch gesture approximately in place on the initial position for a predetermined period of time, then moves the finger across the surface of the touchscreen to a specific destination. A stroke can be distinguished from a "swipe" or "swipe gesture", in which a user touches the touchscreen surface and moves the finger across the touchscreen surface without first maintaining the initial touch at the initial position for the predetermined period of time, and/or without the gesture indicating a specific destination. In some examples, the logic operating the touchscreen may distinguish between a stroke and a swipe based on a specific value defining the predefined period of time. In some examples, the logic operating the touchscreen may distinguish between a stroke and a swipe based on the stroke indicating a specific destination for the finger movement.

A swipe is usually fast, and is typically used to detect only the direction of movement of the finger. Thus, the user can typically release the finger from the touchscreen at any time and at any position without affecting how the gesture is interpreted. In contrast, a stroke is typically more accurate: the user needs to confirm both direction and distance, meaning that the user needs to release their finger at a final target location (also called the destination).

As used herein, the terms "graphical user interface", "GUI", "user interface", and "UI" are used interchangeably, unless otherwise indicated, to refer to aspects of a visual user interface displayed on a touchscreen. The term "GUI element" refers to a visual component of a GUI, such as an icon or a window. The terms "GUI screen" or "UI screen" are used interchangeably, unless otherwise indicated, to refer to a visual pattern of a GUI that typically includes multiple GUI elements.

As used herein, statements that a second item (e.g., a value, calculation, or determination) is "based on" a first item may mean that characteristics of the second item are affected or determined at least in part by characteristics of the first item. The first item may be considered an input to an operation or calculation, or a series of operations or calculations, that produces the second item as an output that is not independent from the first item.

In some aspects, the present disclosure describes a method for selection of a target graphical user interface (GUI) element on a touchscreen of a device. A main GUI screen is displayed on the touchscreen. The GUI screen comprises a plurality of regions including a target region. The target region comprises the target GUI element. A scaled up target region GUI screen, comprising a scaled up target GUI element, is displayed on the touchscreen when an initial portion of a stroke gesture on the touchscreen is detected. The initial portion of the stroke gesture comprises an initial position of the stroke gesture within the main GUI screen. The scaled up target GUI element is displayed over a larger screen area than the target GUI element. The scaled up target region GUI screen is displayed based on the initial position of the stroke gesture. A command of the device associated with the target GUI element is executed when a final portion of the stroke gesture on the touchscreen is detected. The final portion of the stroke gesture comprises a final position of the stroke gesture within the scaled up target region GUI screen. The final position of the stroke gesture corresponds to a location of the scaled up target GUI element.

In some aspects, the present disclosure describes a device comprising a processor device, a touchscreen, and a memory storing machine-executable instructions. The instructions, when executed by the processor device, cause the device to facilitate selection of a target graphical user interface (GUI) element on the touchscreen. A main GUI screen is displayed on the touchscreen. The GUI screen comprises a plurality of regions including a target region. The target region comprises the target GUI element. A scaled up target region GUI screen, comprising a scaled up target GUI element, is displayed on the touchscreen when an initial portion of a stroke gesture on the touchscreen is detected. The initial portion of the stroke gesture comprises an initial position of the stroke gesture within the main GUI screen. The scaled up target GUI element is displayed over a larger screen area than the target GUI element. The scaled up target region GUI screen is displayed based on the initial position of the stroke gesture. A command of the device associated with the target GUI element is executed when a final portion of the stroke gesture on the touchscreen is detected. The final portion of the stroke gesture comprises a final position of the stroke gesture within the scaled up target region GUI screen. The final position of the stroke gesture corresponds to a location of the scaled up target GUI element.

In some aspects, the present disclosure describes a non-transitory processor-readable medium having machine-executable instructions stored thereon which, when executed by a processor of a device, cause the device to facilitate selection of a target graphical user interface (GUI) element on a touchscreen of the device. A main GUI screen is displayed on the touchscreen. The GUI screen comprises a plurality of regions including a target region. The target region comprises the target GUI element. A scaled up target region GUI screen, comprising a scaled up target GUI element, is displayed on the touchscreen when an initial portion of a stroke gesture on the touchscreen is detected. The initial portion of the stroke gesture comprises an initial position of the stroke gesture within the main GUI screen. The scaled up target GUI element is displayed over a larger screen area than the target GUI element. The scaled up target region GUI screen is displayed based on the initial position of the stroke gesture. A command of the device associated with the target GUI element is executed when a final portion of the stroke gesture on the touchscreen is detected. The final portion of the stroke gesture comprises a final position of the stroke gesture within the scaled up target region GUI screen. The final position of the stroke gesture corresponds to a location of the scaled up target GUI element.

In some examples, the target region further comprises a plurality of additional GUI elements. The scaled up target region GUI screen further comprises a plurality of additional scaled up GUI elements. Each additional scaled up GUI element corresponding to a respective additional GUI element and being displayed over a larger screen area than the respective additional GUI element.

In some examples, displaying the scaled up target region GUI screen comprises, based on the initial position of the stroke gesture, selecting, from a plurality of scaled up GUI screens corresponding to the plurality of regions, the scaled up target region GUI screen corresponding to the target region, and displaying the selected scaled up target region GUI screen.

In some examples, selecting the scaled up target region GUI screen from the plurality of scaled up GUI screens comprises determining that the initial position of the initial portion of the stroke gesture is within the target region.

In some examples, selecting the scaled up target region GUI screen from the plurality of scaled up GUI screens further comprises determining that the device is operating in a same-side mapping GUI mode.

In some examples, selecting the scaled up target region GUI screen from the plurality of scaled up GUI screens comprises determining that the initial position of the initial portion of the stroke gesture is not within the target region.

In some examples, the initial portion of the stroke gesture further comprises an initial direction of movement of the stroke gesture. Selecting the scaled up target region GUI screen from the plurality of scaled up GUI screens further comprises determining that the initial direction of movement of the stroke gesture is toward the target region.

In some examples, selecting the scaled up GUI screen from the plurality of scaled up GUI screens further comprises determining that the device is operating in an opposite-side mapping GUI mode.

In some examples, detecting the initial portion of the stroke gesture comprises detecting a touch at the initial position. Detecting that the touch persists at the initial position for more than a predetermined period of time.

In some examples, detecting the initial portion of the stroke gesture further comprises detecting that, after the touch persists at the initial position for more than the predetermined period of time, the touch moves in an initial direction of movement.

In some examples, the scaled up target region GUI screen comprises a subset of keys of a virtual keyboard, and the scaled up target GUI element comprises a key of the subset of keys.

In some examples, the plurality of regions comprises a first region and the target region. Displaying the scaled up target region GUI screen comprises, in response to determining that the initial position of the initial portion of the stroke gesture is within the first region, selecting the scaled up target region GUI screen from a plurality of scaled up GUI screens. The plurality of scaled up GUI screens comprise the scaled up target region GUI screen, and a scaled up first region GUI screen comprising a further subset of keys of the virtual keyboard. The selected scaled up target region GUI screen is displayed.

BRIEF DESCRIPTION OF THE DRAWINGS

Reference will now be made, by way of example, to the accompanying drawings which show example embodiments of the present application, and in which:

FIG. 8A is a front view of the smart watch of FIG. 1, showing a first stroke gesture effective to select an "S" key of the virtual keyboard of FIG. 7;

FIG. 8B is a front view of the smart watch of FIG. 1, showing a second stroke gesture effective to select a "K" key of the virtual keyboard of FIG. 7;

FIG. 8C is a front view of the smart watch of FIG. 1, showing a third stroke gesture effective to select a "Y" key of the virtual keyboard of FIG. 7;

Similar reference numerals may have been used in different figures to denote similar components.

DESCRIPTION OF EXAMPLE EMBODIMENTS

The present disclosure describes methods, devices, and media for xxx

Figure 1:
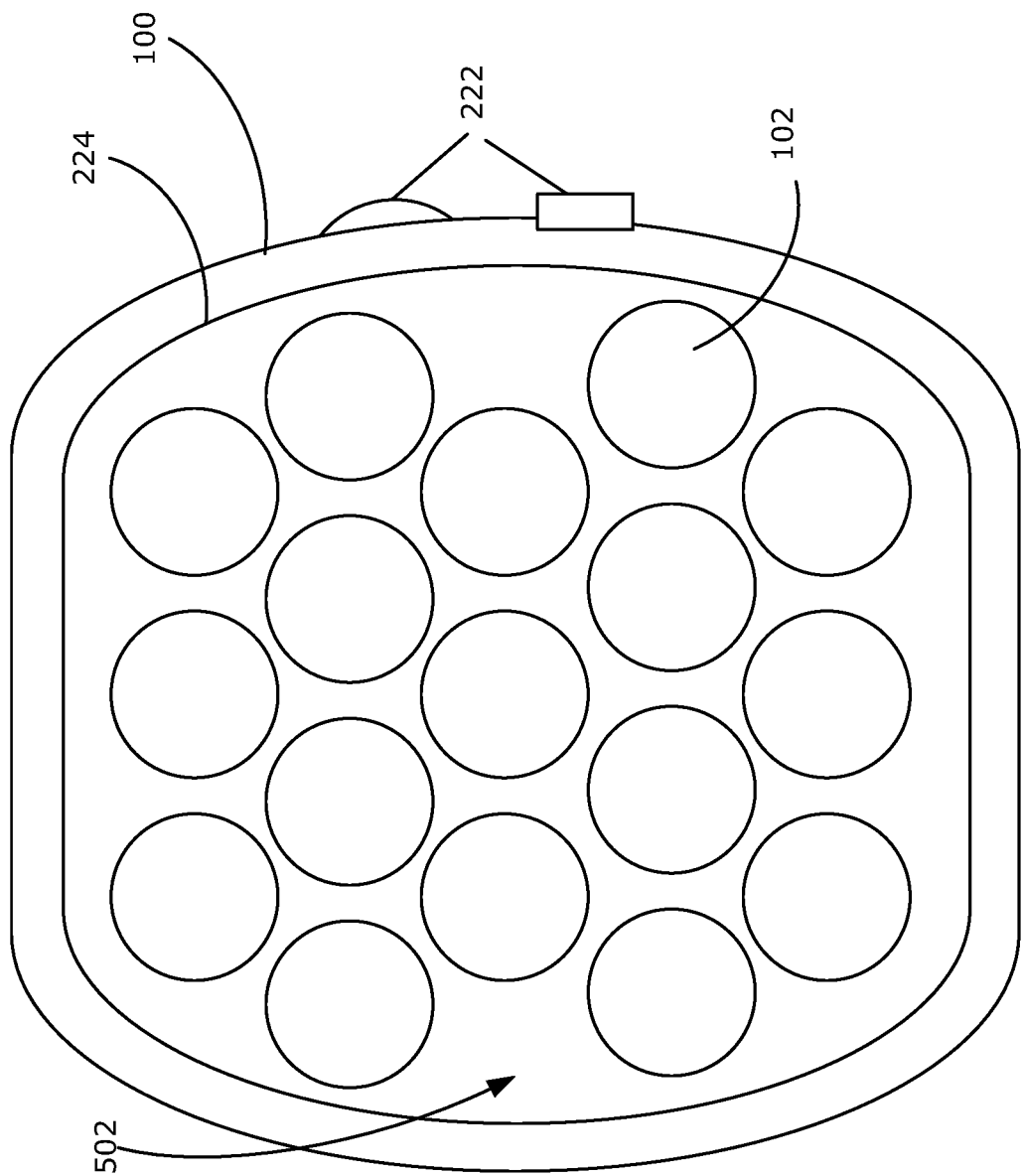
FIG. 1 is a front view of a smart watch showing a main graphical user interface (GUI) screen displayed thereon, according to examples described herein.

FIG. 1 shows a front view of a smart watch 100 showing a main graphical user interface (GUI) screen 502 displayed on the touchscreen 224 of the smart watch 100. The components of an example smart watch 100 are described in detail with reference to FIG. 2 below. In FIG. 1, the visible components include a touchscreen 224 occupying the watch face, as well as one or more buttons and/or dials 222 shown on the right side of the smart watch 100.

The main UI screen 502 may be a home screen or other user interface screen displayed on the touchscreen. The main UI screen 502 includes several GUI elements 102, such as icons. Any one of these GUI elements 102 could be a target for a target selection task performed by a user. When the touchscreen 224 detects selection of one of the target GUI elements 102, the smart watch 100 may execute a command associated with the selected GUI element 102. For example, each GUI element may be an icon corresponding to a different software application of the smart watch 100, such as mapping, messaging, music, and telephone applications.

It will be appreciated that, if the touchscreen 224 of the smart watch 100 is only a few square centimeters in area, then each GUI element 102 of the illustrated main UI screen 502 may only occupy a few square millimeters of display area on the touchscreen 224. Example embodiments described herein may facilitate target selection and/or target confirmation in such a GUI environment such that the fat finger problem is avoided or mitigated.

Figure 2:
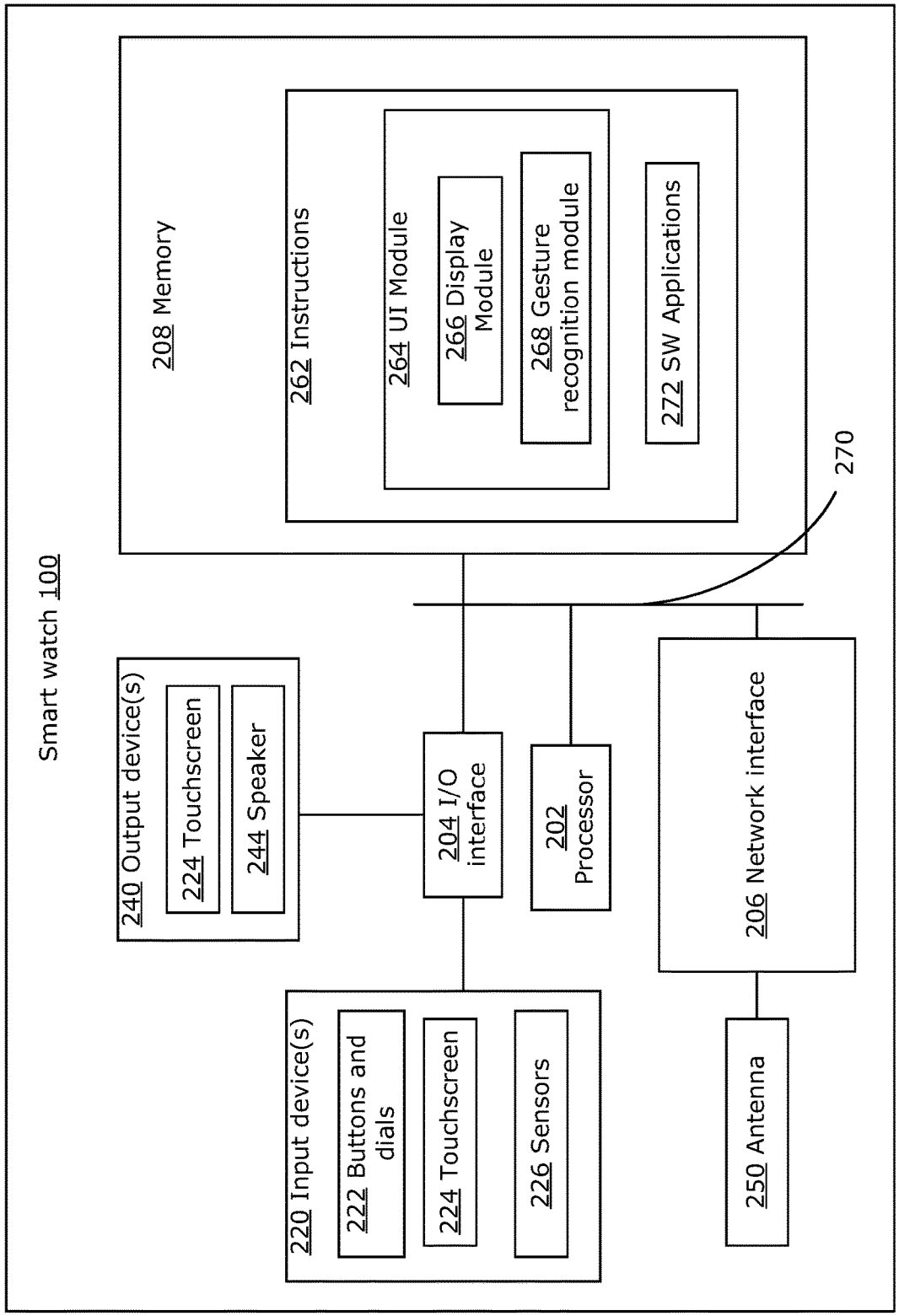
FIG. 2 is a block diagram illustrating some components of the example smart watch of FIG. 1.

FIG. 2 shows a block diagram of a device suitable for implementing and performing examples described herein, shown as the smart watch 100. Although an example embodiment of the smart watch 100 is shown and discussed below, other embodiments of such a device may be used to implement examples disclosed herein, which may include components different from those shown. Although FIG. 2 shows a single instance of each component of the smart watch 100, there may be multiple instances of each component shown.

The smart watch 100 includes one or more processors 202, such as a central processing unit, a microprocessor, an application-specific integrated circuit (ASIC), a field-programmable gate array (FPGA), a dedicated logic circuitry, or combinations thereof. The one or more processors 202 may collectively be referred to as a "processor device".

The smart watch 100 also includes one or more input/output (I/O) interfaces 204 which interface with input devices 220 and output devices 240. Input devices 220 may include one or more mechanical buttons and/or dials 222, the touchscreen 224 (in its capacity as a touch sensitive surface), and one or more sensors 232 such as an inertial measurement units (IMU), a microphone, etc. In some embodiments, additional input devices may be included in, or used in communication with, the smart watch 100, such as keyboards 228, cameras, and any other input means. Output devices 240 may include the touchscreen 224 (in its capacity as a display), speakers 244, and other output means.

The smart watch 100 may include one or more network interfaces 206 for wired or wireless communication with a network (e.g., an intranet, the Internet, a P2P network, a WAN and/or a LAN). The network interface(s) 206 may include wired links (e.g., Ethernet cable) and/or wireless links (e.g., one or more antennas 250) for intra-network and/or inter-network communications.

The smart watch 100 includes one or more memories (collectively the memory 208), which may include a volatile or non-volatile memory (e.g., a flash memory, a random access memory (RAM), and/or a read-only memory (ROM)). The non-transitory memory 208 may store instructions 262 for execution by the processor device 202, such as instructions to carry out examples described in the present disclosure. The memory 208 may include other software instructions 262, such as for implementing an operating system and other software applications 272 or functions. For example, various software applications 272 may implement the commands executed in response to detection of a target selection task performed by a user to select a target GUI element 102 associated with a command.

The instructions 262 may include instructions for implementing a user interface (UI) module 264 for performing the UI techniques described herein. The UI module 264 may include a display module 266 for displaying the various UI screens and UI elements described herein on the touchscreen 224. The UI module 264 may also include a gesture recognition module 268 for detecting and recognizing gestures, such as touch and stroke gestures described herein, performed by a user on the touchscreen 224.

In some examples, the smart watch 100 may also include, or be in communication with, one or more electronic storage units (not shown), such as a solid state drive, a hard disk drive, a magnetic disk drive and/or an optical disk drive. In some examples, one or more data sets and/or modules may be provided by an external memory (e.g., an external drive in wireless communication with the smart watch 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the smart watch 100 may communicate with each other via a bus 270, for example.

Figure 3:
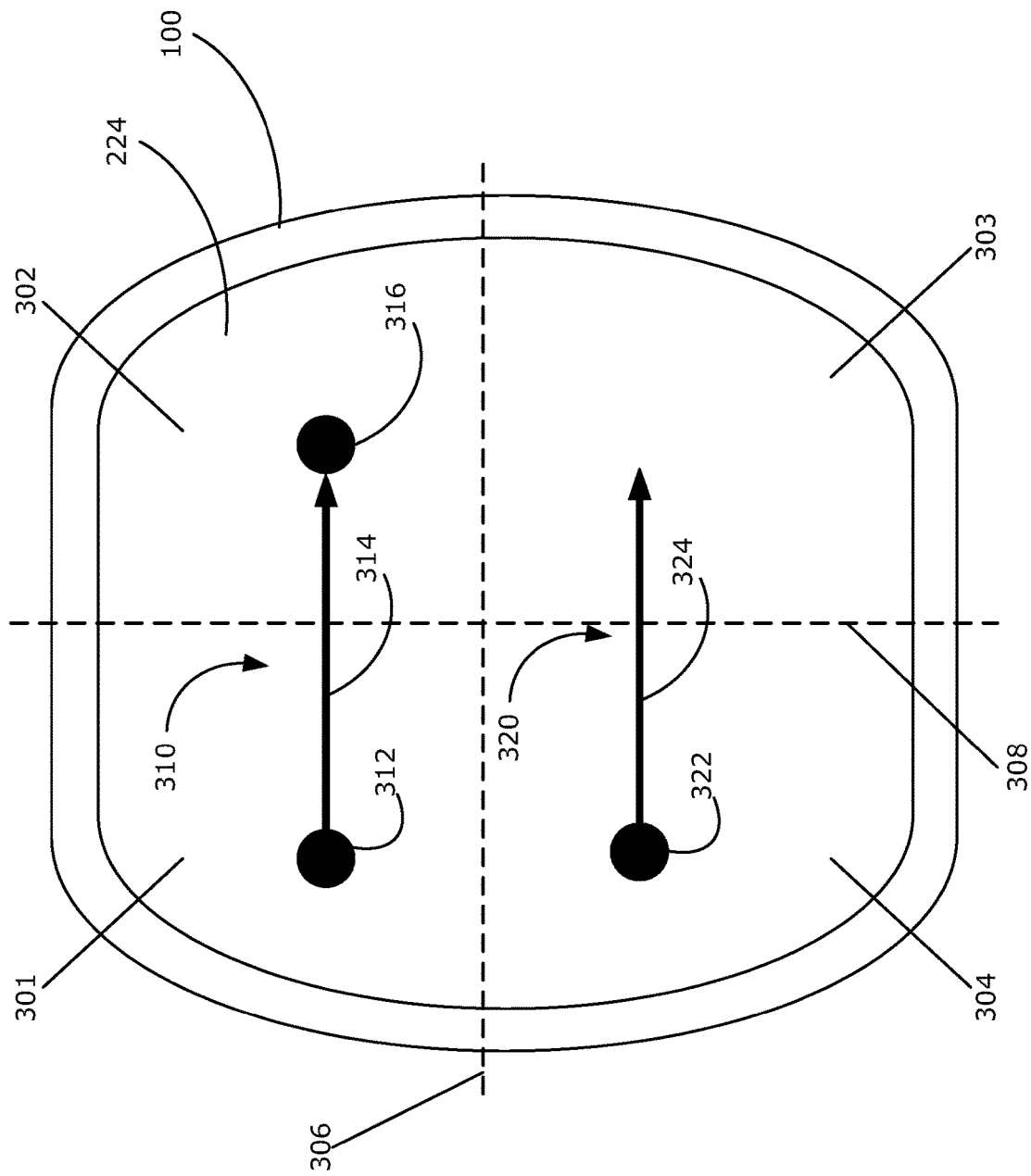
FIG. 3 is a front view of the smart watch of FIG. 1, showing an example stroke gesture and an example initial portion of a stroke gesture, according to examples described herein.

FIG. 3 shows examples of gestures being performed on the touchscreen 224 of the smart watch 100. The display area of the touchscreen 224 is divided into four regions 301, 302, 303, 304 by a vertical line 308 and a horizontal line 306. It will be appreciated that some examples may use more or fewer than four regions, such as two regions. The four regions are, clockwise from the top left: a first region 301 (also called the upper left region or quadrant), a second region 302 (also called the upper right region or quadrant), a third region 303 (also called the lower right region or quadrant), and a fourth region 304 (also called the lower left region or quadrant). In examples described herein, the four regions 301, 302, 303, 304 may correspond to four regions of a UI screen displayed on the touchscreen 224.

A complete stroke gesture 310 is shown extending from the first region 301 to the second region 302. The stroke gesture 310 begins when a user touches the initial position 312 in the first region 301 with a finger. The finger remains in contact with the touchscreen 224 at the initial position 312 for at least a predetermined duration of time, such as 100 milliseconds or one second. The gesture recognition module 268 of the UI module 264 running on the processor device 202 of the smart watch 100 may recognize the touch gesture, maintained at or near the initial position 312 for at least the predetermined duration of time, as initiating a stroke gesture 310.

After the initial touch gesture has been maintained at or near the initial position 312 for at least the predetermined duration of time, the user moves the finger across the touchscreen 224 in direction 314 while maintaining contact with the touchscreen 224. At final position 316, the finger is lifted off of the touchscreen 224, indicating that the stroke 310 is complete, with the final position 316 indicating the destination or target of the stroke gesture 310.

An initial portion 320 of a second stroke gesture is also shown. The initial portion 320 of the second stroke includes its own initial position 322 and initial direction 324, as described above with reference to the first stroke 310. However, in the case of the initial portion 320, the finger has not yet been lifted off of the touchscreen 224, and so there is as yet no final position for the second stroke. This means that the user can still decide to change the direction of the finger's movement after the finger has completed the initial portion 320 of the stroke by moving in initial direction 324 and then releasing the touch by moving the finger out of contact with the touchscreen 224.

Strokes and swipes are common interaction gestures used to operate touchscreens. As described above in the Summary section, a stroke gesture is distinct from a swipe gesture. A swipe normally is defined as moving one or more fingers across the screen in a specific direction. A swipe is usually fast, and is typically used to detect only the direction of movement of the finger. Thus, the user can typically release the finger from the touchscreen at any time and at any position without affecting how the gesture is interpreted. Swipe gestures are typically used to execute commands such as switching the current UI screen to a previous or next UI screen.

In contrast, a stroke is typically more accurate: the user needs to indicate both direction and distance, meaning that the user needs to release their finger at a final target location (also called the destination). Stroke gestures are typically used to execute commands such as dragging an icon to another location.

Embodiments described herein use stroke gestures to facilitate target selection and/or target confirmation. In the context of the present disclosure, a stroke gesture may be conceptualized by a user as a "stroke with initial position", because the initial position 322 of the initial portion 320 of the stroke is used to determine the nature of the UI screen or other visual feedback that is displayed on the touchscreen during the stroke. In some examples, the initial direction 324 of the stroke is also used to determine the nature of the UI screen or other visual feedback that is displayed on the touchscreen during the stroke.

In some examples, the stroke gestures described herein may be interpreted by the gesture recognition module 668 as distinct from each other insofar as they differ in direction 314, distance (i.e. distance from initial position 312 to final position 316), and initial position 316. However, if all three such attribute of two strokes are identical, they will cause the smart watch 100 to trigger the same command. For example, if the two strokes are moving towards different directions 312, moving in the same direction but with different distance (i.e. the vector from initial position 312 to final position 316), or starting from different initial positions 316, they are different strokes.

Figure 4:
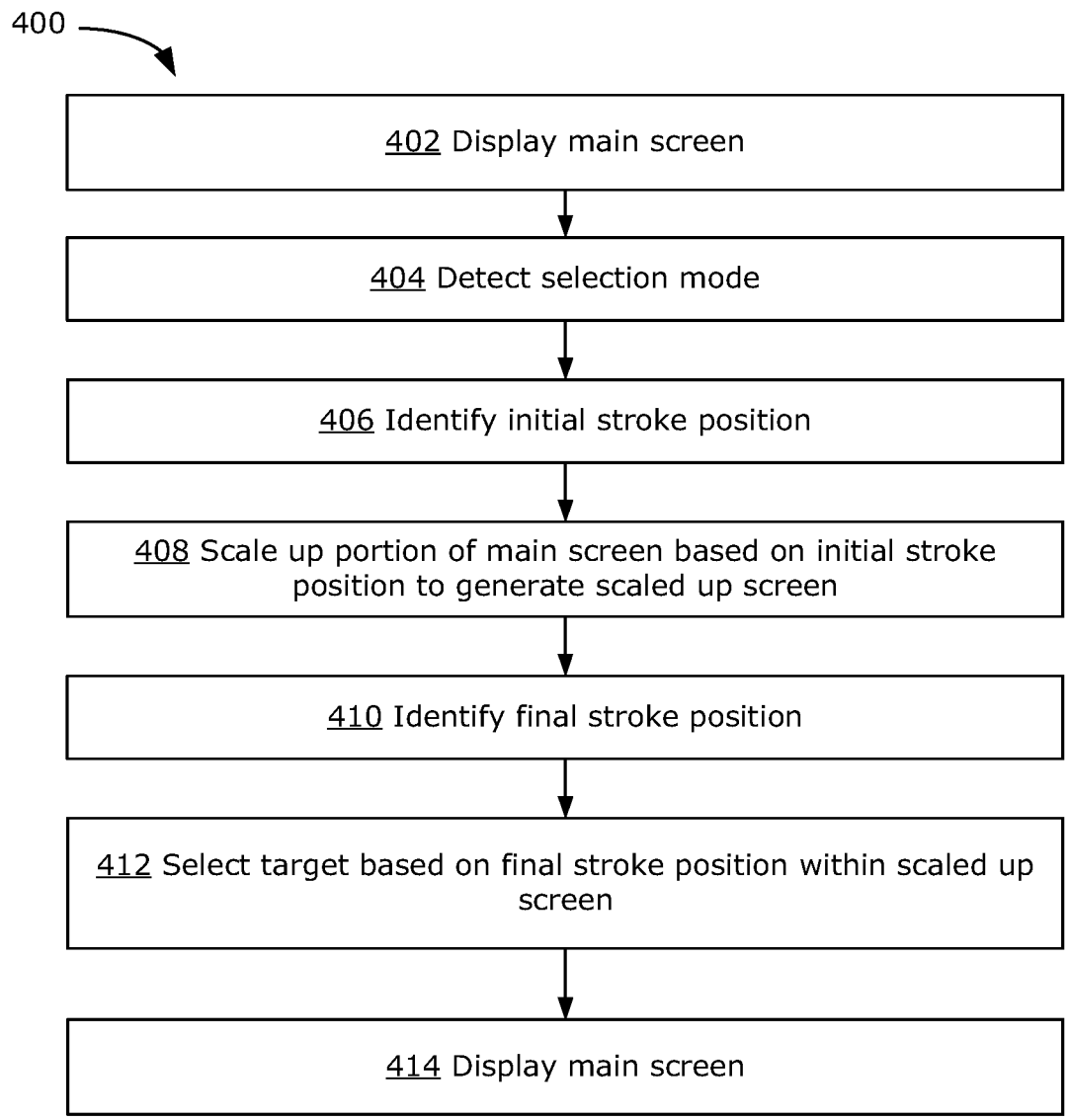
FIG. 4 is a flowchart illustrating steps of an example method for facilitating selection of a target GUI element on a touchscreen, according to examples described herein.

FIG. 4 shows steps of an example method 400 for facilitating selection of a target GUI element on a touchscreen.

At 402, the main UI screen 502 is displayed on the touchscreen 224 by the display module 266. This may be a default resting state of the smart watch 100, or it may be a specific UI screen already selected for display by user action. Any UI screen displayed on the touchscreen 224 may be implemented using the techniques herein such that the given UI screen is considered to be the main UI screen described in the context of method 400.

The main UI screen 502 includes multiple GUI elements 102 that may be selected as targets by the user. Furthermore, as shown in FIG. 3, the main UI screen 502 includes multiple regions, such as regions 310, 302, 303, 304. In various examples, a given UI screen such as the main UI screen may include more or fewer than four regions, such as two or eight regions. In some examples, the regions may be distributed within the main UI screen 502 horizontally, vertically, radially, and/or by some other arrangement. In some examples, each separate GUI element of the main UI screen constitutes its own distinct region: for example, the main UI screen 502 may include only four icons, one at the center of each of the four regions 301, 302, 303, 304.

At 404, optionally, a selection mode of the smart watch 100 is detected. In some examples, the smart watch 100 may be configurable (e.g., by a user or by individual software applications 272) in either of two or more selection modes. This configuration may be stored as data in the memory 208 accessible by the UI module 264 in some embodiments. One selection mode may be a same-side mapping GUI mode, as described below with reference to FIGS. 5A-B, and one mode may be an opposite-side mapping GUI mode, as described below with reference to FIGS. 6A-B. The UI module 264 determines which selection mode (also called a GUI mode or a selection GUI mode) the smart watch 100 is configured to operate in, and that mode is used to determine how the UI module 264 responds to touchscreen input. In some embodiments, the smart watch 100 always operates in the same selection mode, and step 404 may not be necessary. When the UI module 264 is operating in a same-side mapping GUI mode, it is said to be providing a same-side mapping GUI; when operating in an opposite-side mapping GUI mode, it is said to be providing an opposite-side mapping GUI.

At 406, the gesture recognition module 268 detects an initial portion 320 of a stroke gesture by the user on the touchscreen 224. As described above, initial portion 320 of a stroke begins with a touch gesture at the initial location 322 within the main GUI screen 502. The touch is then maintained in place such that it persists for at least a predetermined duration of time. In some examples, the initial portion 320 of the stroke is only detected when the user then moves the finger across the touchscreen in the initial direction 324. In other examples, the initial portion 320 of the stroke is detected after the touch is maintained for at least the predetermined duration of time. In various embodiments, the predetermined duration of time may be configurable (e.g., by a user or by individual software applications 272). In some embodiments, the predetermined duration of time may be fixed, for example at one second or some other duration suitable to distinguish a swipe from a stroke.

At 408, in response to detecting the initial portion 320 of the stroke gesture, the display module 266 displays, on the touchscreen 224, a scaled up UI screen based on the initial portion 320 of the stroke gesture as well as the selection mode. The scaled up UI screen displays enlarged versions of the GUI elements of the target region selected by the initial portion of the stroke gesture. Depending on the number and size of the regions of the main UI screen 502, the scaled up UI screen may therefore potentially enlarge the GUI elements of the target region by up to a factor of 2, 4, 8, or however many regions are in the main UI screen 502.

Figure 5B:
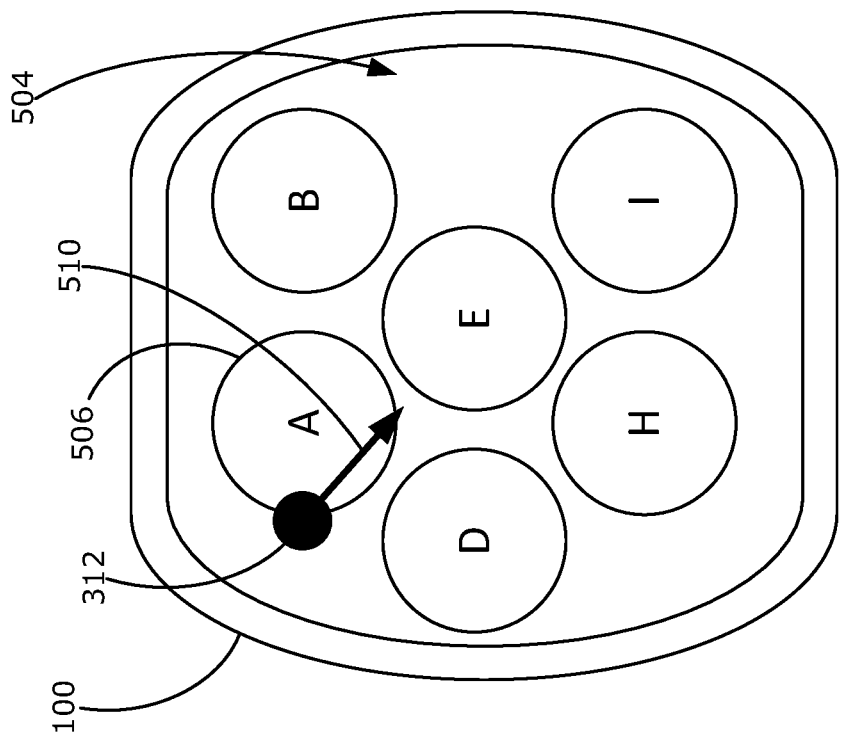
FIG. 5B is a front view of the smart watch of FIG. 5A, displaying a scaled GUI screen of a same-side mapping GUI in response to the initial portion of the stroke gesture of FIG. 5A.
Figure 5A:
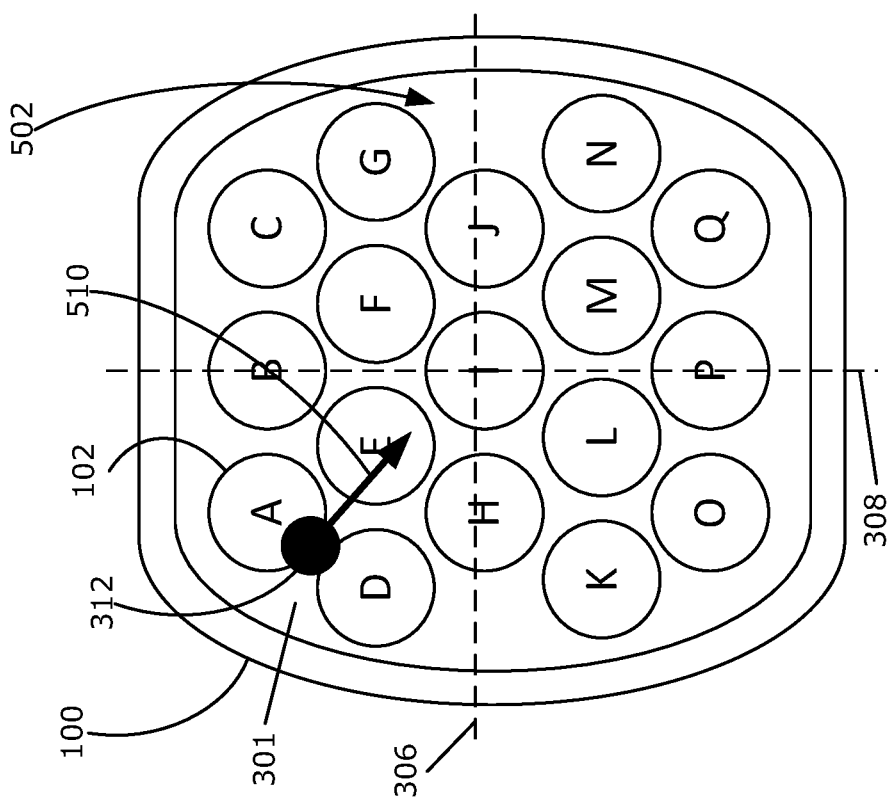
FIG. 5A is a front view of the smart watch of FIG. 1, showing an initial portion of a stroke gesture on a main GUI screen.

FIGS. 5A-5B show the operation of the gesture recognition module 268 in detecting the initial portion of a stroke gesture during step 406, and the operation of the display module 266 in displaying a scaled up UI screen on the touchscreen 224 during step 408, when the smart watch 100 is configured to operate in a same-side mapping selection mode.

FIG. 5A shows an initial portion of a stroke gesture on the main GUI screen 502. The initial position 312 of the stroke is located within the first region 301. The gesture recognition module 268 detects the initial portion 312 of the stroke gesture during step 406. In some examples, as described above, the initial portion of the stroke is not detected until the finger moves in direction 510.

FIG. 5B shows the operation of the display module 266 in displaying a scaled up UI screen on the touchscreen 224 during step 408, when the smart watch 100 is configured to operate in a same-side mapping selection mode. Same-side mapping means that the region 301 where the initial position 312 is located is the target region 301 that is scaled up at step 408. Thus, a scaled up UI screen 504 is displayed at step 408. The scaled up UI screen 504 includes scaled up versions of the one or more GUI elements 102 shown in the target region 301 of the main UI screen 502, shown here as GUI elements A, B, D, E, H, and I. The scaled up versions of the one or more GUI elements 102 may be referred to as scaled up GUI elements 506.

Thus, if a user is using a device configured in a same-side mapping UI mode, and the user intends to select a target GUI element (e.g., GUI element E) located within a target region (e.g. region 301), then the user will begin a stroke gesture with an initial position 312 located within the target region (e.g., 301). Further steps in the target selection task will be performed in accordance with the further steps of method 400.

It will be appreciated that, in some examples, the target region (e.g., 301) comprises a target GUI element and also one or more additional GUI elements. In such examples, the scaled up target region GUI screen 504 will include the scaled up target GUI element as well as one or more additional scaled up GUI elements, each additional scaled up GUI element corresponding to a respective additional GUI element and being displayed over a larger screen area than the respective additional GUI element from the main UI screen 502.

Figure 6B:
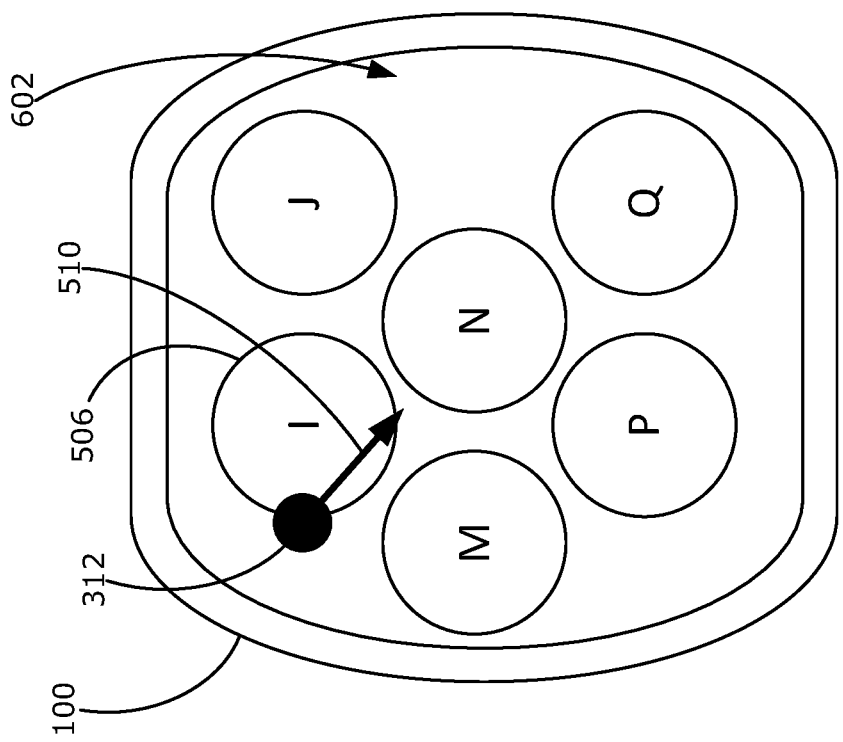
FIG. 6B is a front view of the smart watch of FIG. 6A, displaying a scaled GUI screen of an opposite-side mapping GUI in response to the initial portion of the stroke gesture of FIG. 6A.
Figure 6A:
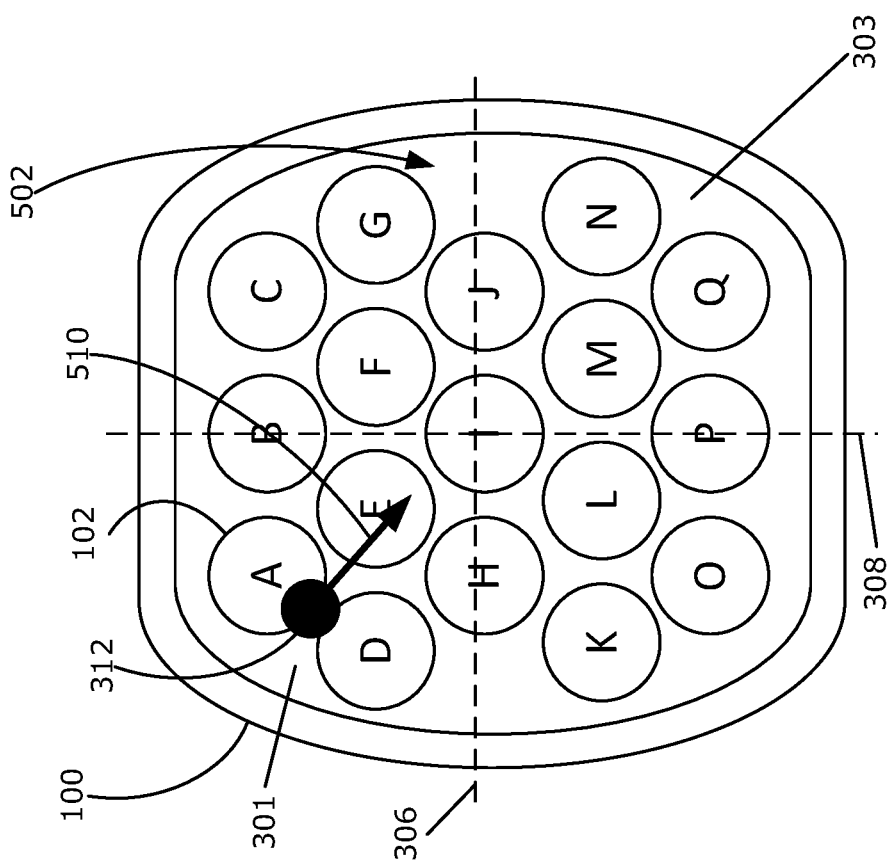
FIG. 6A is a front view of the smart watch of FIG. 1, showing an initial portion of a stroke gesture on a main GUI screen.

FIGS. 6A-6B show the operation of the gesture recognition module 268 in detecting the initial portion of a stroke gesture during step 406, and the operation of the display module 266 in displaying a scaled up UI screen on the touchscreen 224 during step 408, when the smart watch 100 is configured to operate in an opposite-side mapping selection mode.

FIG. 6A is exactly equivalent to FIG. 5A. Thus, step 406 is performed identically regardless of the selection mode (i.e., same-side or opposite-side).

However, FIG. 6B shows the operation of the display module 266 in displaying a scaled up UI screen on the touchscreen 224 during step 408, when the smart watch 100 is configured to operate in an opposite-side mapping selection mode. Opposite-side mapping means that the region

301 where the initial position 312 is located is not the region 303 that is scaled up at step 408. In some examples, the target region 303 is identified based on it being located opposite the region 301 where the initial position 312 is located. In some examples, the direction 510 is detected at step 408 and is also used to identify the target region 303: for example, the target region 303 may be identified as the region of the main UI screen 502 that is not the region 301 where the initial position 312 is located, but is a region located in direction 510 relative to the region 301 where the initial position 312 is located.

A scaled up UI screen 602 is displayed at step 408. The scaled up UI screen 602 includes scaled up versions of the one or more GUI elements 102 shown in the target region 303 of the main UI screen 502, shown here as GUI elements I, J, M, N, P, and Q. The scaled up versions of the one or more GUI elements 102 may be referred to as scaled up GUI elements 506.

Thus, if a user is using a device configured in an opposite-side mapping UI mode, and the user intends to select a target GUI element (e.g., GUI element N) located within a target region (e.g. region 303), then the user will begin a stroke gesture with an initial position 312 located in a region 301 opposite the target region (e.g., 303), or in a different region from the target region 303 while performing an initial direction 510 of the stroke moving toward the target region 303. Further steps in the target selection task will be performed in accordance with the further steps of method 400.

It will be appreciated that regions of a main UI screen 502 may in some examples overlap with each other, and may therefore share some GUI elements (such as GUI element "I" shared by all four regions 301, 302, 303, 304), whereas in some examples the regions may be distinct from each other with no shared GUI elements. It will also be appreciated that the arrangement of the scaled up GUI elements 506 in the scaled up UI screen 504, 602 may differ from how their corresponding GUI elements 102 are arranged in the region of the main UI screen 502.

In some examples, the scaled up UI screen 504, 602 may not be displayed over the entire display area of the touchscreen 224. However, at minimum the scaled up GUI elements 506 are displayed over a larger screen area in the scaled up UI screen 504, 602 than the GUI elements 102 on the main UI screen 502. This is the feature that facilitates user selection of the target GUI element from the scaled up GUI elements 506.

Returning to FIG. 4, at 410 the gesture recognition module 268 detects a final portion of the stroke gesture by the user on the touchscreen 224, by detecting the final position 316 of the stroke. The final portion of the stroke ends at the final position 316 of the stroke. In some examples, the direction 314 of the stroke may change during the stroke gesture, as the user course-corrects to arrive at a final position 316 corresponding to the location of the scaled up target GUI element 506 in the scaled up GUI screen 504, 602. An example of a final portion of a stroke is described below with reference to FIG. 9C.

At 412, the scaled up target GUI element 506 is selected based on the final position 316 of the stroke within the scaled up GUI screen 504, 602. Thus, when the user lifts the finger away from the touchscreen 224 at the final position 316, this action essentially acts as a target confirmation, because the user can visually confirm that the final position 316 is located at the scaled up GUI element 506 before lifting the finger and thereby completing the stroke gesture. In response to the scaled up GUI element 506 being selected, the UI module 264 causes the execution by the processor device 202 of a command of the smart watch 100 associated with the target GUI element 102.

At 414, after the target UI element 102 has successfully been selected and its corresponding command issued for execution, the main UI screen 502 is displayed again by the UI module 264. Thus, the UI is essentially scaled back down to its original size.

Figure 9C:
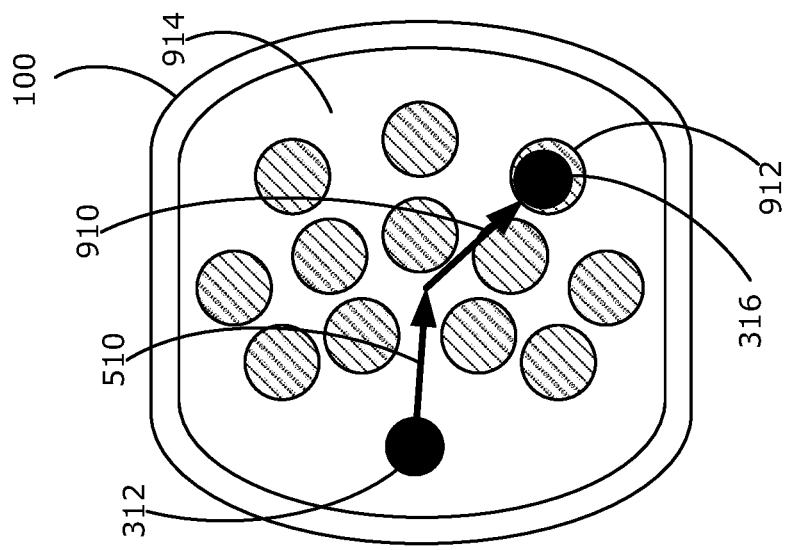
FIG. 9C is a front view of the smart watch of FIG. 1, showing the initial portion and a final portion of the stroke gesture of FIG. 9B on a scaled up GUI screen of an opposite-side mapping GUI.
Figure 9B:
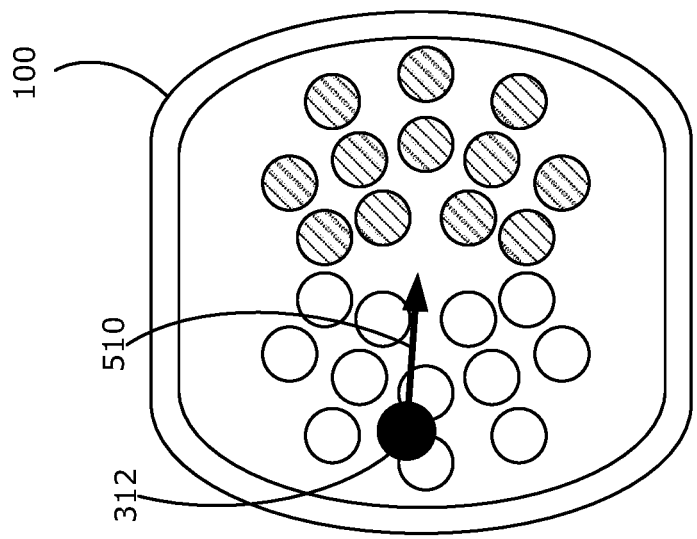
FIG. 9B is a front view of the smart watch of FIG. 1, showing an initial portion of a stroke gesture on the main GUI screen of FIG. 9B.
Figure 9A:
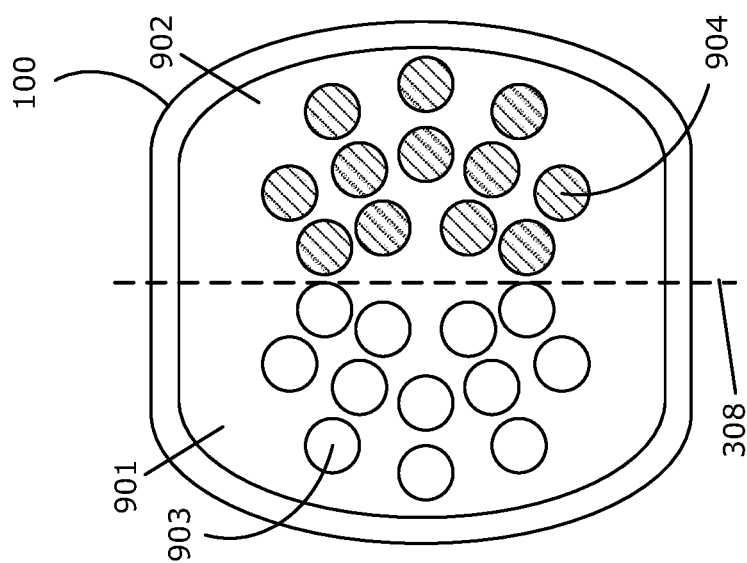
FIG. 9A is a front view of the smart watch of FIG. 1, showing a main GUI screen comprising two regions.

FIGS. 9A-9C show an example sequence of GUI screens displayed before and during a stroke gesture according to the method 400. The examples of FIGS. 9A-9C show the operation of method 400 operating in an opposite-side mapping GUI mode.

FIG. 9A shows a main GUI screen 902 comprising two regions: a left region 903 and a right region 902, defined by vertical line 308. Each region 901, 902 includes a plurality of GUI elements 903, shown as icons radiating from the center of the main GUI screen 502 in a spray pattern.

FIG. 9B shows an initial portion of a stroke gesture on the main GUI screen 902. The initial portion of the stroke gesture is defined by the initial position 312 and initial direction 510. The gesture recognition module 268 recognizes the stroke gesture based on the initial maintenance of the touch at the initial position 312 for the predetermined duration, and optionally based on the direction 510, as described above in reference to step 406 of method 400.

FIG. 9C shows a scaled up GUI screen 914 that is displayed by the display module 266 at step 408 in response to detecting the initial portion of the stroke gesture. Because the smart watch 100 is operating in an opposite-side mapping GUI mode, and the initial position 312 is in left region 901 (and also optionally because the initial direction 510 is pointing toward the right region 902), the scaled up GUI screen 914 is a scaled up version of the right region 902, showing scaled up GUI elements that correspond to the GUI elements 904 of the right region 902, and including scaled up target GUI element 912. A final portion of the stroke gesture is shown in FIG. 9C, including a final direction 910 and a final position 316 corresponding to the location of the scaled up target GUI element 912. The final direction 910 is a direction in which the finger moves across the touchscreen 224 after the initial direction 510. By correcting course in the final direction 910 to move toward the scaled up target GUI element, and then lifting the finger at the final position 316, the user is able to accurately navigate the scaled up UI screen 914 and accurately confirm the target selection.

In each example described above, each region (such as 301 or 303) of the main UI screen 502 corresponds to a respective scaled up UI screen (such as 504 or 602). In some such examples, the scaled up UI screen displayed at step 408 is selected from a plurality of scaled up GUI screens corresponding to the plurality of regions based on the initial position 312 (and optionally the initial direction 510) of the stroke gesture. Specifically, the scaled up target region GUI screen (such as screen 504 in FIG. 5B) corresponds to the target region (i.e., region 301 in FIG. 5B). However, it will be appreciated that in some embodiments the scaled up UI screen may be generated dynamically based on the initial position 312 of the stroke gesture.

Figure 7:
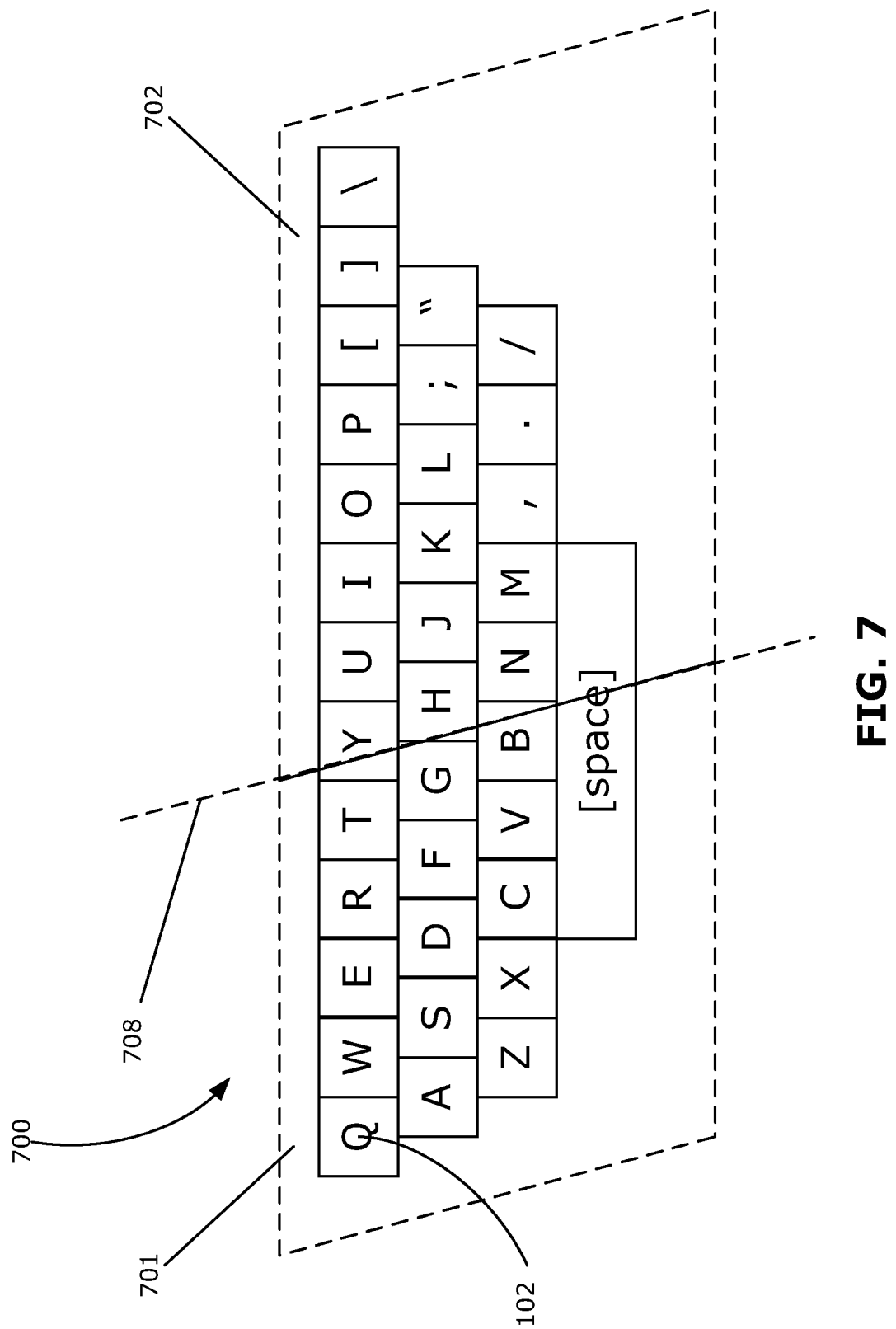
FIG. 7 is an example virtual keyboard GUI screen split into two regions, according to examples described herein.

FIG. 7 shows a further example embodiment implementing a virtual keyboard using same-side or opposite-side mapping GUI mode operation. A virtual keyboard GUI screen 700 is split into two regions: a left region 701 and a right region 702. Each region 701, 702 includes multiple GUI elements mapped to keys of the virtual keyboard. These two regions 701, 702 may be treated as potential target regions as in the examples described above, using either same-side or opposite-side mapping GUI mode operation. In some examples, to implement the virtual keyboard of FIG. 7, the smart watch 100 may display a main UI screen that does not show the entire virtual keyboard as shown in FIG. 7: instead, the main UI screen 502 may display visual content unrelated to the virtual keyboard, or may display a stylized visual indicator that the smart watch 100 is operating in a virtual keyboard mode. In such examples, the mapping of keys shown in FIG. 7 only indicates what scaled up GUI elements are displayed in each scaled up UI screen.

FIGS. 8A-8C show a sequence of user interactions with the virtual keyboard GUI of FIG. 7 on a smart watch 100 to type the word "sky", operating in an opposite-side mapping GUI mode.

FIG. 8A shows a first stroke gesture 810 moving from the right region 702 toward the left region 701 to select an "S" key of the virtual keyboard. The first stroke gesture 810 has its initial position 312 in the right region 702 and initial direction 314 toward the left region 701. This causes the scaled up GUI screen for left region 701 to be displayed, with the initial position 312 corresponding to the scaled up "G" key 802. The user views the scaled up UI screen for left region 701, showing the keys on the left half of the virtual keyboard, and completes the first stroke gesture 810 at the final position 316 corresponding to the scaled up "S" key 804.

FIG. 8B similarly shows a second stroke gesture 820 moving from the left region 701 toward the right region 702 to select a "K" key of the virtual keyboard. The second stroke gesture 820 has its initial position 312 in the left region 701 and initial direction 314 toward the right region 702. This causes the scaled up GUI screen for right region 702 to be displayed, with the initial position 312 corresponding to the scaled up "H" key 806. The user views the scaled up UI screen for right region 702, showing the keys on the right half of the virtual keyboard, and completes the second stroke gesture 820 at the final position 316 corresponding to the scaled up "K" key 808.

Finally, FIG. 8C shows a third stroke gesture 830 moving from the left region 701 toward the right region 702 to select a "Y" key of the virtual keyboard. The third stroke gesture 830 has its initial position 312 in the left region 701 and initial direction 314 toward the right region 702. This causes the scaled up GUI screen for right region 702 to be displayed, with the initial position 312 corresponding to the scaled up "H" key 806. The user views the scaled up UI screen for right region 702, showing the keys on the right half of the virtual keyboard, and completes the third stroke gesture 830 at the final position 316 corresponding to the scaled up "Y" key 809.

Thus, the example virtual keyboard UI shown in FIGS. 7-8C may be used to display scaled up UI screens each having a subset of keys of the virtual keyboard, wherein each scaled up target GUI element of each scaled up UI screen is a respective key of the scaled up UI screen's respective subset of keys.

In some examples, the scaled up UI screen for each region 701, 702 maps the initial position 312 of the stroke gesture in progress to a key located at the middle of an extreme edge of the region. For example, as shown in FIGS. 8A-8C, the scaled up UI screen for the left region 701 maps the initial position 312 to the "G" key at the middle of the right-most extreme of the region 701, and the scaled up UI screen for the right region 702 maps the initial position 312 to the "H" key at the middle of the left-most extreme of the region 702. This approach may provide the user with the greatest possible amount of screen area to the left or right side, respectively, in which to further maneuver the finger to select the scaled up target GUI element when operating in an opposite-side mapping GUI mode. In a same-side mapping GUI mode, the opposite approach may be used: for example, if an initial position within the left region 701 results in display of the scaled up UI screen for the left region 701, the scaled up UI screen may instead map the initial position 312 to the "A" key, at the middle of the left-most extreme edge of the region 701. In other examples, same-side mapping GUI mode may be used in conjunction with a further feature whereby the target region may be adjusted in mid-stroke. For example, in an embodiments using same-side mapping GUI mode, a user may start a stroke from one region, (e.g., initial position 312 in the left region 701, mapped to the "A" key), resulting in the left region 701 being scaled up. However, if the user actually intended to select a key in the right region 702, the user may notice their error in mid-stroke: in response, the user may continue to hold the stroke and keep moving to the finger to the right. Once the stroke distance goes over a distance threshold, the system will automatically switch from displaying the scaled up left region 701 to displaying the scaled up right region 702. Therefore, no matter where the user starts the stroke, the target key can be reached with a single stroke.

These various approaches have potential advantages and disadvantages. In opposite-side mapping, the keyboard is separate from the middle, and when users start a stroke, it means they start the stroke from the middle of the keyboard (e.g., the "G" or "H" key). In this way, the distance to reach every key is shorter, meaning it is easier for a user to select all keys. However, the potential limitation of opposite-side mapping is that, when the user starts at the wrong initial position 312 (e.g., the user intends to scale up the left region 701 but actually scales up the right region 702), the user needs to release and redo the selection, because if the wrong region is scaled up, the desired key will not be displayed until the stroke is completed. Whereas, in same-side mapping with the distance threshold feature described above, this issue is solved: when user start a stroke from one region, they will first scale up that region of the keyboard, and if they notice that they actually want the other region to be scaled up, they can simply hold the stroke and keep moving toward the desired region. Once the stroke distance is over the distance threshold, the system will automatically display the desired scaled up region. However, the potential limitation of same-side mapping is that the user may need to move a longer distance to complete the stroke.

Relative to existing approaches using tap gestures for target selection, examples described herein using stroke gestures with initial positions may exhibit various advantages. In particular, these examples may provide the advantages of error prevention and integrated operation.

Error prevention may be improved by using stroke-based interaction because strokes allow user to make course corrections during the interaction based on visual feedback, therefore preventing the majority of target selection errors beforehand. This improvement in error prevention is realized for two main reasons.

First, some target selection errors are caused by the fat-finger problem, as described above. When using tap-based interaction, the target size is fixed, and a user may accidentally tap on one of the items surrounding the target if the spatial interval between items is small. In contrast, in stroke-based interaction, the target and the items surrounding it, as well as the intervals between them, are simultaneously scaled up, so that the fat-finger problem is not as serious as when the elements are displayed at their original size.

Second, when users are selecting a target, they may tap on one unwanted target and then realize their mistake immediately after the touch. In this scenario, tap-based interaction provides no way to avert the error. Once a user taps on the unwanted item, the only action left for the user is to release the finger, which completes the tap operation. As a result, the unwanted target is selected and the user has to first undo the incorrect selection, and then redo the right one. However, for stroke-based interaction, the user still has full control of the selection even after reaching the wrong target. When the user reaches the wrong target and realizes the error, the user can simply adjust the stroke direction while continuing to hold the stroke and keep moving toward the correct target.

Integrated operation may be realized using stroke-based interaction because it combines the actions of (Zoom In)-(Target Selection)-(Zoom Out) into a single operation, which may significantly reduce the time required for selection of one small target. For example, a conventional tap-based interaction for small target selection on a conventional smart watch typically requires at least 3 steps, such as:
1. Zoom in on the target area using either a double tap, a two-finger pinch out gesture, or rotation of a dial.
2. Tap on the enlarged target to select it.
3. Zoom out from the target area using either a double tap, a two-finger pinch in gesture, or a further rotation of the dial.

This 3-step procedure is the optimal case for current small target selection on conventional smart watches, and it also exhibits further limitations, including false positive detection between double taps and single taps, as well as awkward gestures for two-finger pinch in or out on small watch touchscreens.

In contrast, when using stroke-based interaction as described herein, there is only one operation required: a single stroke. Once a user begins performing the stroke, the initial position of the stroke is detected by the system, and the target region is automatically identified. When the user holds the stroke and moves towards the target GUI element, the target region is scaled up. When the user reaches the scaled up target GUI element and releases the stroke, the target is selected and the target region is automatically scaled back down to its original scale.

The stroke-based interactions described herein can be applied in contexts other than smart watches. They could be applied, for example, to other devices with touch pads or touchscreens, including smartphones or remote controllers for smart TVs and VR displays. The core interaction of the described examples is that the user identifies the region to scale up based on the target location, and uses the initial position of the stroke to command the system to scale up the target region. Therefore, as long as the touchscreen or touch pad could identify the stroke and its initial position, this interaction is feasible. In addition to the described embodiments, where visual support is always available, this interaction could also be applied in a scenario in which user vision is limited, for example in a virtual reality (VR) scenario, in which the user has to wear a VR head mounted display (HMD) and cannot see a hand-held controller equipped with a touchscreen or touch pad. In such a scenario, as long as the user can find the general location of the touch area, according to bezel touch feedback, they can use the stroke-based interaction techniques described herein.
General Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for selection of a target graphical user interface (GUI) element on a touchscreen of a device, comprising:
displaying, on the touchscreen, a main GUI screen, the main GUI screen comprising a plurality of regions including a target region, the target region comprising the target GUI element;
displaying, on the touchscreen, a scaled up target region GUI screen comprising a scaled up target GUI element when an initial portion of a stroke gesture on the touchscreen is detected, the initial portion of the stroke gesture further comprising an initial direction of movement of the stroke gesture, wherein the scaled up target region GUI screen corresponding to the target region is selected from a plurality of scaled up GUI screens corresponding to the plurality of regions based on the initial position of the stroke gesture, wherein the selecting includes determining that the device is operating in an opposite-side mapping GUI mode, and determining that the initial position of the initial portion of the stroke gesture is not within the target region and that the initial direction of movement of the stroke gesture is toward the target region, the initial portion of the stroke gesture comprising an initial position of the stroke gesture within the main GUI screen, the scaled up target GUI element being displayed over a larger screen area than the target GUI element, the scaled up target region GUI screen being displayed based on the initial position of the stroke gesture; and executing a command of the device associated with the target GUI element when a final portion of the stroke gesture on the touchscreen is detected, the final portion of the stroke gesture comprising a final position of the stroke gesture within the scaled up target region GUI screen, the final position of the stroke gesture corresponding to a location of the scaled up target GUI element.

2. The method of claim 1, wherein:
the target region further comprises a plurality of additional GUI elements; and
the scaled up target region GUI screen further comprises a plurality of additional scaled up GUI elements, each additional scaled up GUI element corresponding to a respective additional GUI element and being displayed over a larger screen area than the respective additional GUI element.

3. The method of claim 1, wherein:
selecting the scaled up target region GUI screen from the plurality of scaled up GUI screens comprises:
determining that the initial position of the initial portion of the stroke gesture is within the target region.

4. The method of claim 3, wherein:
selecting the scaled up target region GUI screen from the plurality of scaled up GUI screens further comprises:
determining that the device is operating in a same-side mapping GUI mode.

5. The method of claim 1, wherein:
detecting the initial portion of the stroke gesture comprises:
detecting a touch at the initial position; and
detecting that the touch persists at the initial position for more than a predetermined period of time.

6. The method of claim 5, wherein:
detecting the initial portion of the stroke gesture further comprises:
detecting that, after the touch persists at the initial position for more than the predetermined period of time, the touch moves in an initial direction of movement.

7. The method of claim 1, wherein:
the scaled up target region GUI screen comprises a subset of keys of a virtual keyboard; and
the scaled up target GUI element comprises a key of the subset of keys.

8. The method of claim 7, wherein:
the plurality of regions comprises a first region and the target region;
displaying the scaled up target region GUI screen comprises:
in response to determining that the initial position of the initial portion of the stroke gesture is within the first region, selecting the scaled up target region GUI screen from a plurality of scaled up GUI screens comprising:
the scaled up target region GUI screen; and
a scaled up first region GUI screen comprising a further subset of keys of the virtual keyboard; and
displaying the selected scaled up target region GUI screen.

9. A device comprising:
a processor device;
a touchscreen; and
a memory storing machine-executable instructions which, when executed by the processor device, cause the device to facilitate selection of a target graphical user interface (GUI) element on the touchscreen by:
displaying, on the touchscreen, a main GUI screen the main GUI screen comprising a plurality of regions including a target region, the target region comprising the target GUI element;
displaying, on the touchscreen, a scaled up target region GUI screen comprising a scaled up target GUI element when an initial portion of a stroke gesture on the touchscreen is detected, the initial portion of the stroke gesture further comprising an initial direction of movement of the stroke gesture, wherein the scaled up target region GUI screen corresponding to the target region is selected from a plurality of scaled up GUI screens corresponding to the plurality of regions based on the initial position of the stroke gesture, wherein the selecting includes determining that the device is operating in an opposite-side mapping GUI mode, and determining that the initial position of the initial portion of the stroke gesture is not within the target region and that the initial direction of movement of the stroke gesture is toward the target region, the initial portion of the stroke gesture comprising an initial position of the stroke gesture within the main GUI screen, the scaled up target GUI element being displayed over a larger screen area than the target GUI element, the scaled up target region GUI screen being displayed based on the initial position of the stroke gesture; and
executing a command of the device associated with the target GUI element when a final portion of the stroke gesture on the touchscreen is detected, the final portion of the stroke gesture comprising a final position of the stroke gesture within the scaled up target region GUI screen, the final position of the stroke gesture corresponding to a location of the scaled up target GUI element.

10. The device of claim 9, wherein:
the target region further comprises a plurality of additional GUI elements; and
the scaled up target region GUI screen further comprises a plurality of additional scaled up GUI elements, each additional scaled up GUI element corresponding to a respective additional GUI element and being displayed over a larger screen area than the respective additional GUI element.

11. The device of claim 9, wherein:
selecting the scaled up target region GUI screen from the plurality of scaled up GUI screens comprises:
determining that the initial position of the initial portion of the stroke gesture is within the target region.

12. The device of claim 11, wherein:
selecting the scaled up target region GUI screen from the plurality of scaled up GUI screens comprises:
determining that the initial position of the initial portion of the stroke gesture is not within the target region.

13. The device of claim 9, wherein:
detecting the initial portion of the stroke gesture comprises:
detecting a touch at the initial position;
detecting that the touch persists at the initial position for more than a predetermined period of time; and detecting that, after the touch persists at the initial position for more than the predetermined period of time, the touch moves in an initial direction of movement.

14. The device of claim 9, wherein:
the scaled up target region GUI screen comprises a subset of keys of a virtual keyboard; and
the scaled up target GUI element comprises a key of the subset of keys.

15. A non-transitory processor-readable medium having machine-executable instructions stored thereon which, when executed by a processor of a device, cause the device to facilitate selection of a target graphical user interface (GUI) element on a touchscreen of the device, by:
displaying, on the touchscreen, a main GUI screen, the main GUI screen comprising a plurality of regions including a target region, the target region comprising the target GUI element;
displaying, on the touchscreen, a scaled up target region GUI screen comprising a scaled up target GUI element when an initial portion of a stroke gesture on the touchscreen is detected, the initial portion of the stroke gesture further comprising an initial direction of movement of the stroke gesture, wherein the scaled up target region GUI screen corresponding to the target region is selected from a plurality of scaled up GUI screens corresponding to the plurality of regions based on the initial position of the stroke gesture, wherein the selecting includes determining that the device is operating in an opposite-side mapping GUI mode, and determining that the initial position of the initial portion of the stroke gesture is not within the target region and that the initial direction of movement of the stroke gesture is toward the target region, the initial portion of the stroke gesture comprising an initial position of the stroke gesture within the main GUI screen, the scaled up target GUI element being displayed over a larger screen area than the target GUI element, the scaled up target region GUI screen being displayed based on the initial position of the stroke gesture; and
executing a command of the device associated with the target GUI element when a final portion of the stroke gesture on the touchscreen is detected, the final portion of the stroke gesture comprising a final position of the stroke gesture within the scaled up target region GUI screen, the final position of the stroke gesture corresponding to a location of the scaled up target GUI element.

* * * * *